United States Patent [19]
Yokose et al.

[11] Patent Number: 5,822,463
[45] Date of Patent: Oct. 13, 1998

[54] IMAGE CODING APPARATUS UTILIZING A PLURALITY OF DIFFERENT QUANTIZATION-WIDTH ESTIMATION METHODS

[75] Inventors: Taro Yokose; Akihiro Andoh; Shunichi Kimura; Setsu Kunitake; Yutaka Koshi; Koh Kamizawa, all of Kanagawa, Japan

[73] Assignee: Fuji Xerox Co., Ltd., Tokyo, Japan

[21] Appl. No.: 917,168

[22] Filed: Aug. 25, 1997

Related U.S. Application Data

[63] Continuation of Ser. No. 424,627, Apr. 19, 1995, abandoned.

[30] Foreign Application Priority Data

Sep. 30, 1994 [JP] Japan ................................ 6-237708

[51] Int. Cl.$^6$ ................................................ H04N 1/41
[52] U.S. Cl. ................................ 382/251; 358/433
[58] Field of Search ................................ 382/248, 250, 382/251; 358/432, 433; 348/405, 404, 419

[56] References Cited

U.S. PATENT DOCUMENTS

| | | | |
|---|---|---|---|
| 4,920,426 | 4/1990 | Hatori et al. | 358/433 |
| 5,027,214 | 6/1991 | Fujimori | 358/209 |
| 5,073,820 | 12/1991 | Nakagaura et al. | 358/133 |
| 5,263,100 | 11/1993 | Kim et al. | 382/232 |
| 5,289,289 | 2/1994 | Nagasaki | 358/432 |
| 5,412,484 | 5/1995 | Yoshikawa | 358/433 |

FOREIGN PATENT DOCUMENTS 4-2291  1/1992  Japan.

*Primary Examiner*—Joseph Mancuso
*Assistant Examiner*—Larry J. Prikockis
*Attorney, Agent, or Firm*—Finnegan, Henderson, Farabow, Garrett & Dunner, L.L.P.

[57] ABSTRACT

An image transforming section subjects image data to compression processing. A quantizing section quantizes the transformed data using a quantization width. A variable-length coding section subjects the quantized data to variable-length coding. A code-amount computing section determines a total code amount by accumulating partial code amounts. A control section performs control based on the code amount. An estimating method selecting section adaptively selects a quantization width estimating method. A coded result storage section stores data of a code amount corresponding to the quantization width. First and second quantization width estimating sections have different quantization width estimating methods.

12 Claims, 13 Drawing Sheets

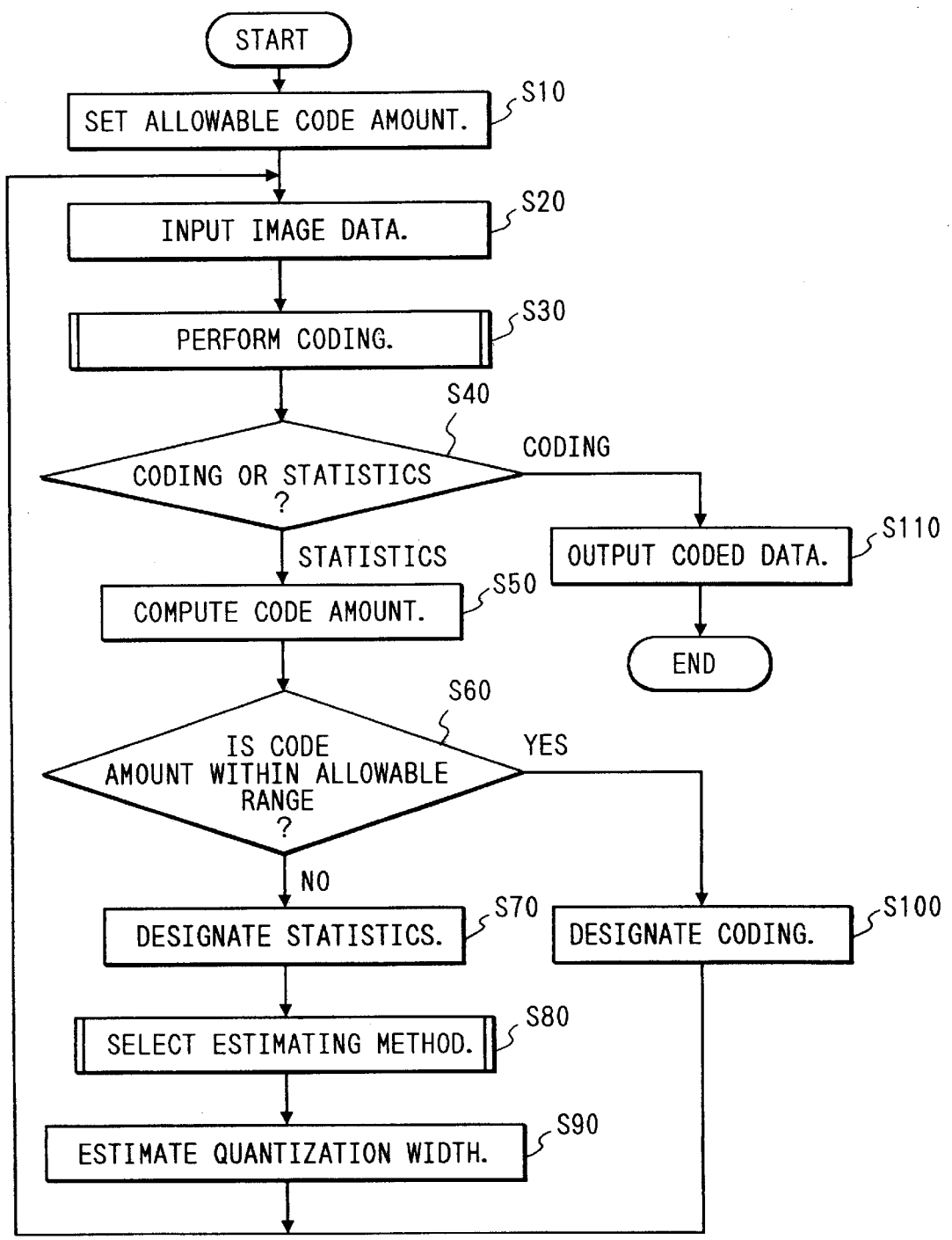

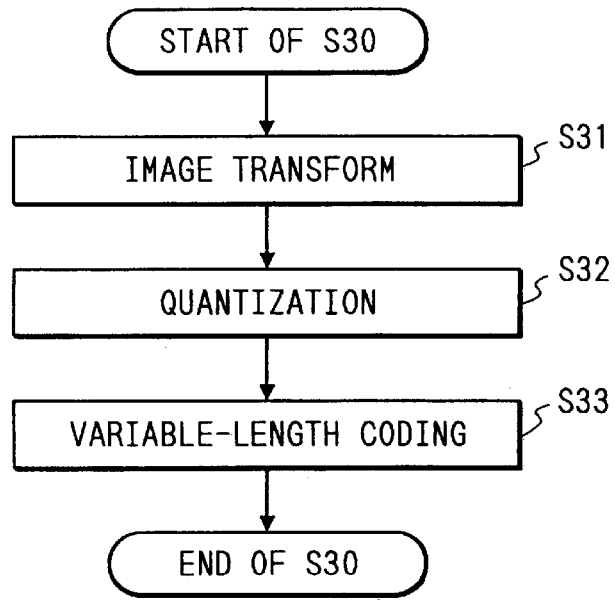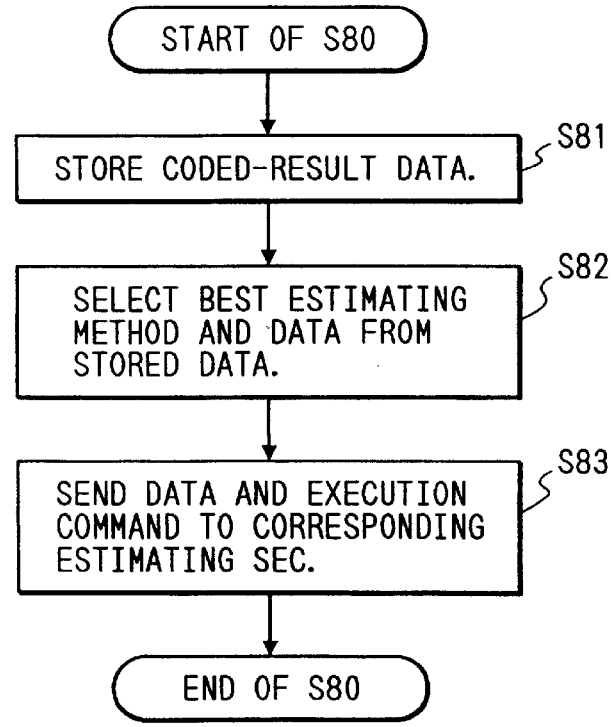

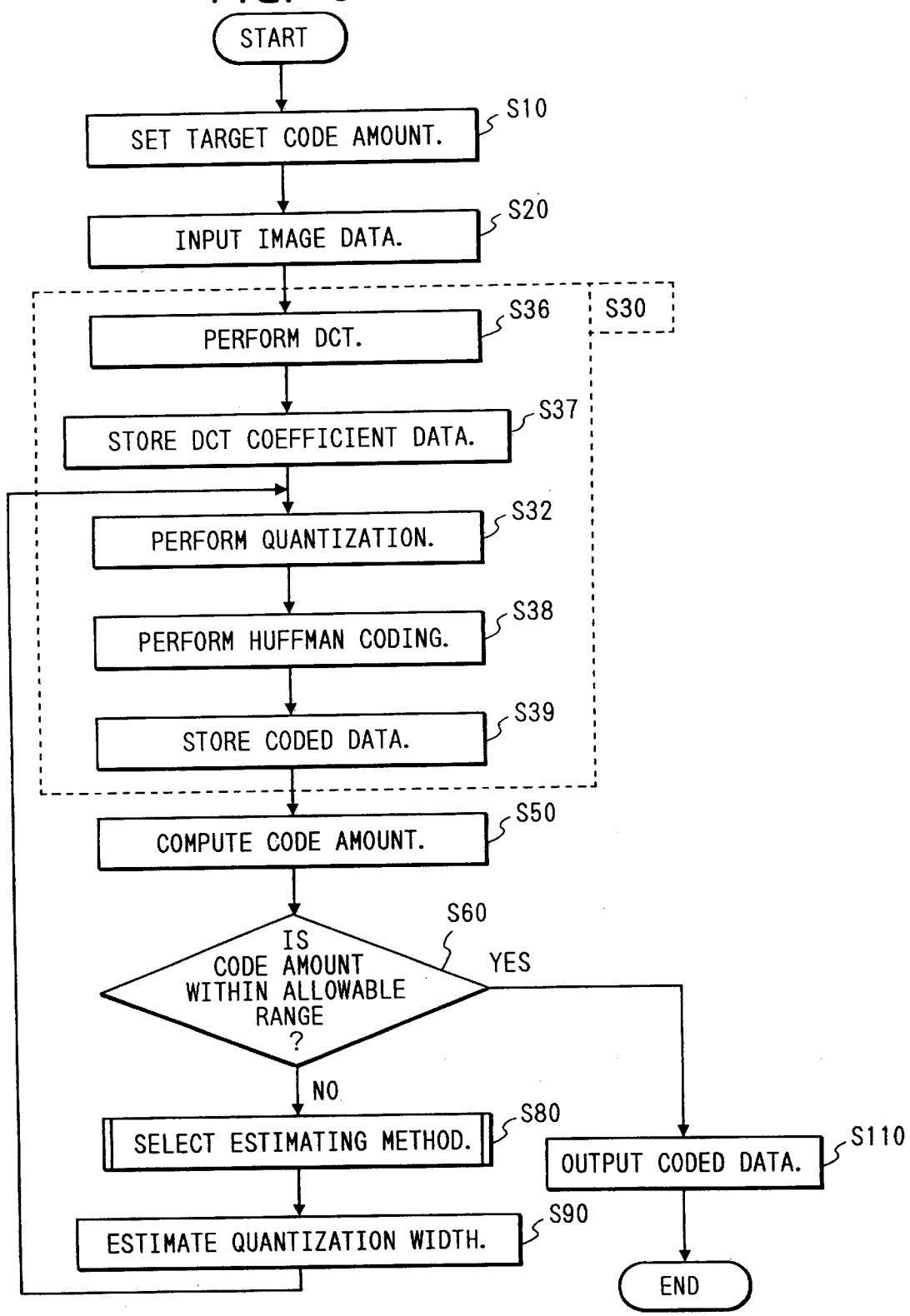

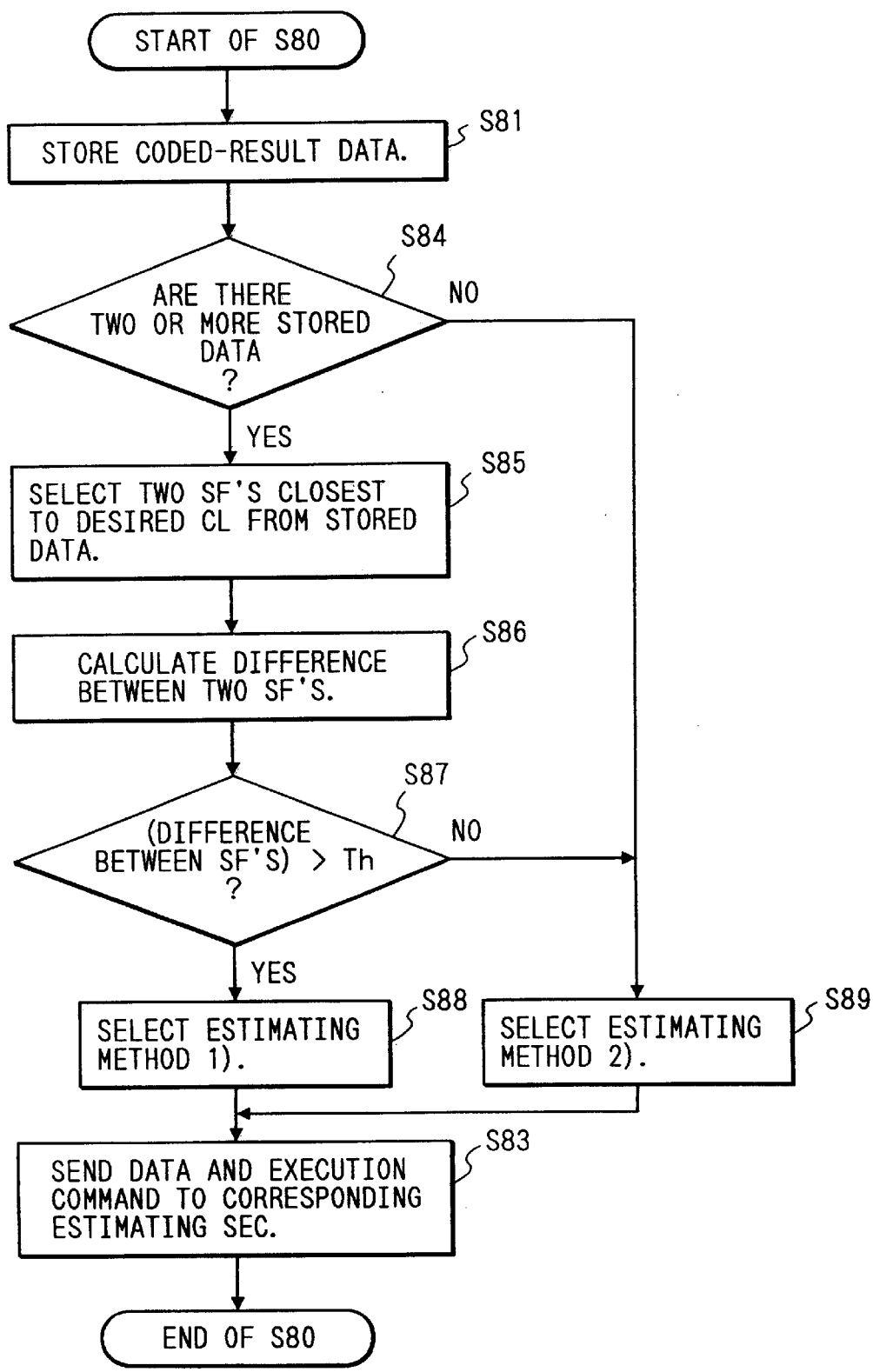

| | SF | CL |
|---|---|---|
| No. 1 | 1.00 | 1024 |
| No. 2 | 1.34 | 824 |
| ⋮ | ⋮ | ⋮ |

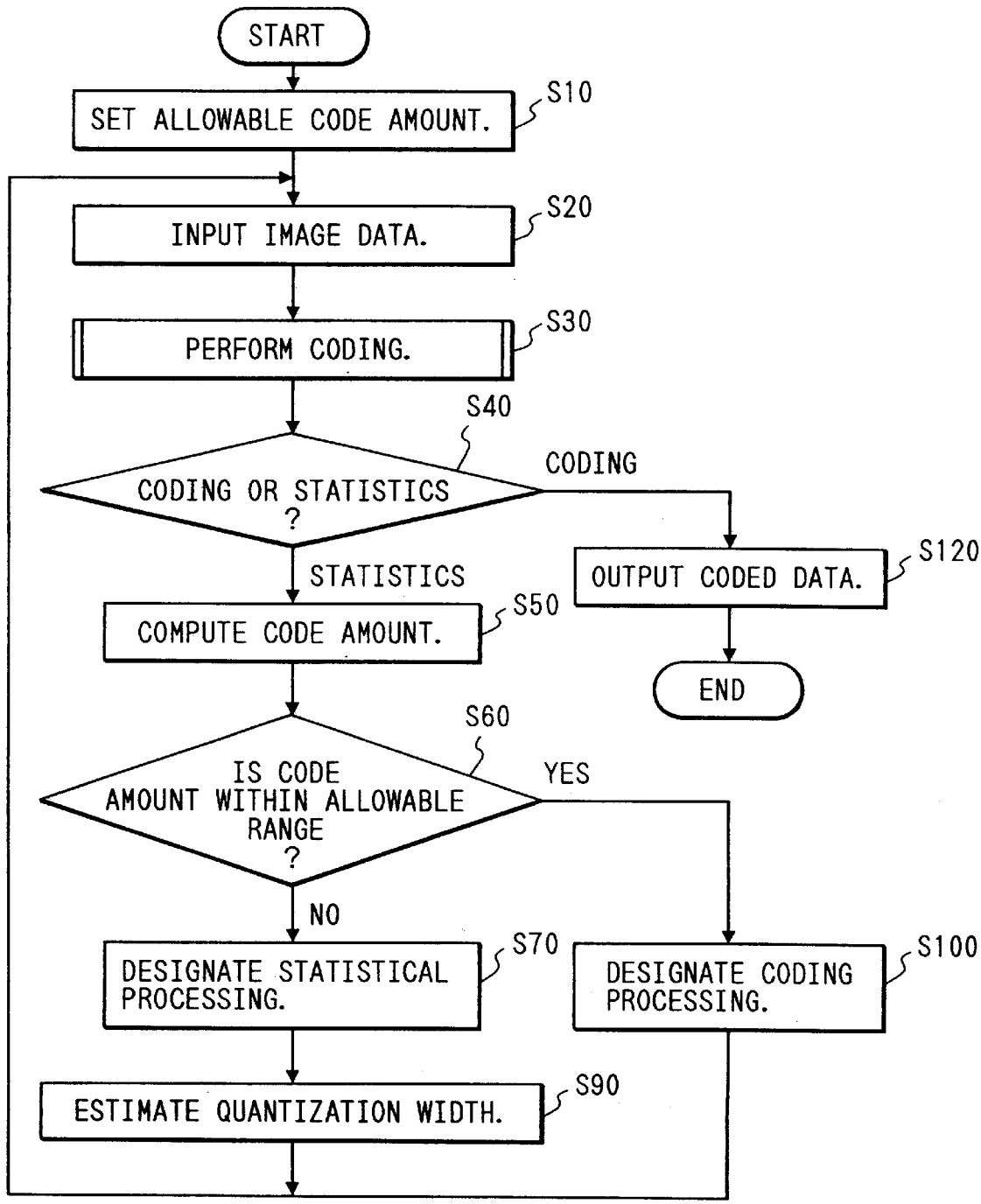

IMAGE CODING APPARATUS UTILIZING A PLURALITY OF DIFFERENT QUANTIZATION-WIDTH ESTIMATION METHODS

This is a continuation of application Ser. No. 08/424,627, filed Apr. 19, 1995, now abandoned.

BACKGROUND OF THE INVENTION

The present invention relates to an image coding apparatus for effecting irreversible coding processing, and more particularly to an image coding apparatus for controlling a code amount.

Since the amount of image data is generally very large, coding processing is carried out when image data is transmitted or stored. Although various techniques are known as techniques for coding image data, if attention is focused on the relationship between the amount of original image data and a code amount after coding, the techniques for coding image data are broadly classified into a variable-length coding system and a fixed-length coding system. In the variable-length coding system, the code amount changes in accordance with the content of the image data, while in the fixed-length coding system, the code amount becomes fixed irrespective of the content of the image data. In the case of the variable-length coding system, in general, the code amount which is generated cannot be known unless coding is carried out. Accordingly, if there is an upper limit to an allowable code amount, there arises a need to control the code amount by some means or other.

Japanese Unexamined Patent Publication No. Hei. 4-2291 discloses an apparatus and method for compressing image data to a level which a storage device permits. FIG. 12 shows an example configuration of a coding apparatus for adjusting a code amount by repeating code processing. Incidentally, although slight changes are made in correspondence with the terms used in this specification, the changes are unrelated to the essence of the invention.

In FIG. 12, reference numeral 10 denotes an image transforming section; 20 denotes a quantizing section; 30 denotes a variable-length coding section; 40 denotes a code-amount computing section; 50 denotes a control section; 420 denotes a quantization-width estimating section; 110 denotes image data; 120 denotes transformed data; 130 denotes quantized data; 140 denotes coded data; 150 denotes partial-code-amount data; 160 and 410 denote total-code-amount data; 170 denotes control data; and 210 denotes quantization-width data.

Next, a description will be given of the operation of each section with reference to FIG. 12. The image transforming section 10 effects transform processing with respect to image data 110 inputted thereto. The transform processing referred to herein means processing for compressing image information, such as a quadrature transform, predictive coding, and the like. The transformed data is sent to the quantizing section 20 as the transformed data 120. The quantizing section 20 quantizes the transformed data 120 inputted thereto, on the basis of the quantization-width data 210 designated by the quantizing-width estimating section 420. Then, the result of this quantization is sent to the variable-length coding section 30 as the quantized data 130. The variable-length coding section 30 subjects the quantized data 130 to variable-length coding processing. Depending on whether a designation by the control section 50 is statistical processing or coding processing, the result of variable-length coding processing is outputted to an external device as the partial-code-amount data 150 in the case of statistical processing and as the coded data 140 in the case of coding processing. The code-amount computing section 40 integrates the partial-code-amount data 150 so as to compute a total code amount in which the overall image or a color component or the like is set as a unit. The total-code-amount data 160 and 410 are respectively sent to the control section 50 and the quantization-width estimating section 420. If the difference between the total-code-amount data 160 and a target code amount designated in advance falls within an appropriate allowable range, the control section 50 designates coding processing and, if not, designates statistical processing. The designation, together with information concerning the target code amount, is sent to the quantization-width estimating section 420 as the control data 170. On the basis of the control data 170 and the total-code-amount data 410, the quantization-width estimating section 420 estimates a width of quantization for obtaining the target code amount, and instructs the result thereof to the quantizing section 20 as the quantization-width data 210.

A description will be given of the operation based on the above-described configuration. FIGS. 13 and 3 are flowcharts illustrating the operation of the coding apparatus shown in FIG. 12. Referring to FIGS. 13 and 3, a description will be given below of the operation of the coding apparatus shown in FIG. 12.

Referring to FIG. 13, in S10, an allowable code amount is set with respect to the control section 50. In S20, the image data 110 is inputted to the image transforming section 10. In S30, a series of coding processing is performed with respect to the image data 110. The details of this step S30 will be described with reference to FIG. 3.

In S31, the image transforming section 10 performs image transform processing for the compression of image information, such as a quadrature transform, predictive coding, or the like, with respect to the image data 110 inputted thereto. In S32, the quantizing section 20 performs quantization processing on the transformed data 120 processed in S31. In S33, the variable-length coding section 30 performs variable-length coding processing on the quantized data 130. The above is the overall coding processing in S30.

As for S30 and subsequent steps, a description will be given by referring again to FIG. 13. In S40, a determination is made by the designation from the control section 50 as to whether statistical processing or coding processing is being carried out. If statistical processing is being carried out, the operation proceeds to S50, and if coding processing is being carried out, the operation proceeds to S120. If the operation has proceeded to S120, the coded data 140 is outputted to an external device, and processing ends.

Meanwhile, in S50, on the basis of the integrated partial-code-amount data 150, the code-amount computing section 40 computes a total code amount in which the overall image or a color component or the like is set as a unit. In S60, the control section 50 determines whether or not the difference between the total-code-amount data 160 and the target code amount set in S10 falls within an appropriate allowable range. If the difference does not fall within the allowable range, the operation proceeds to S70 and, if it falls within the range, the operation proceeds to S100.

If the operation has proceeded to S100, statistical processing is designated by the control section 50, and the operation returns to S20. If the operation has proceeded to S70, statistical processing is designated by the control section 50. Then, in S90, the quantization-width estimating section 420 estimates a quantization width by a predetermined technique on the basis of the control data 170 and the total-code-amount data 410. After estimation processing is completed, the operation returns to S20.

In the above-described processing, the quantization processing in S32 is carried out on the basis of the quantization-width data 210 from the quantization-width estimating section 420. The transformed data obtained in S31 is fixed with respect to each image, and the amount of coded data obtained in S33 is dependent upon the amount of the quantized data 130. In other words, by controlling the quantization-width data 210, it is possible to control the total code amount of the coded data 140 which is finally obtained.

Accordingly, a description will be given hereafter of the estimation processing of the quantization width. A description of the following gist is given by way of example in the above-mentioned publication No. Hei. 4-2291.

If the relationship between a relative ratio SF with respect to the quantization width and a code amount CL is considered with resect to one set of image data, the following formula holds:

$$logCL = a \cdot logSF + b \quad \ldots (1)$$

In Formula (1), a is a substantially fixed constant which is not dependent on the image, and b is a constant which is dependent on the image. Therefore, if a and b can be set at appropriate values in Formula (1), the ratio SF for obtaining a desired code amount can be determined approximately. By using the values obtained here as initial values of the quantization width and by subsequently using a technique such as the Newton-Raphson method, it is possible to obtain the ratio SF corresponding to the desired code amount CL.

According to the coding method described in the above-mentioned publication No. Hei. 4-2291, the Newton-Raphson method is used in estimation processing by way of example. However, when an experiment was actually conducted on the basis of the coding method described in that publication, it was revealed that differences exist between the aforementioned Formula (1) and the result of the actual experiment.

FIG. 14 is a graph schematically illustrating an example of the experiment conducted concerning the relationship between the relative ratio SF with respect to the quantization width and the code amount CL.

The differences between the aforementioned Formula (1) and the result of the actual experiment are as follows:

Difference 1): Although the ratio SF assumes continuous values, the code amount CL is capable of assuming only discrete values in view of the characteristic quantization processing. Accordingly, if the graph shown in FIG. 14 is enlarged, it is thought that the line is a step-like one as shown in FIG. 15.

Difference 2): If the graph showing the result of the experiment is examined in detail, a large number of small projections and depressions are observable, and it cannot be said that the line is smooth.

Difference 3): On the contrary, if a wide range of the ratio SF is examined, there are cases where the overall graph depicts not a straight line but a large arc.

Difference 4): As a result of the examination, a in Formula (1) is low in image dependence as compared to b, and is not fixed irrespective of the image, and a slight difference can be noted.

Accordingly, a number of problems actually arise according to the coding method of the conventional art. Prior to a description of these problems, a description will be given of the basic principle of the Newton-Raphson method with reference to FIG. 16. Now, it is assumed that a function f(x) is present, and an attempt is made to obtain such X that Y=f(X) with respect to certain Y.

The Newton-Raphson method is performed by the following procedure. First, an appropriate initial value $x_0$ is selected, and $f(x_0)$ is calculated. Next, $f'(x_0)$, which is the differential coefficient of f(x) in $x_0$, is determined. Then, $x_1$ is calculated from the following formula:

$$x_1 = f'(x_0)^{-1}\{y - f(x_0)\} + x_0 \quad \ldots (2)$$

After $x_1$ is obtained, similar processing is repeated by using $x_1$ instead of $x_0$, and $x_2$ is obtained. If this processing is repeated, $x_n$ (n=0, 1, 2, . . .) gradually approaches X, so that when the difference between Y and $f(x_n)$ has become an allowable error, processing ends.

The technique disclosed in the above-mentioned publication No. Hei. 4-2291 is one in which, in the above-described algorithm, logSF and logCL, for example, are considered as X and Y, respectively, and the relative ratio SF with respect to the quantization width for obtaining an arbitrary code amount CL is determined.

In practice, however, the Newton-Raphson method cannot be directly used for determining the ratio SF. The reason for this is that, in the Newton-Raphson method, f(x) can be applied to only a differentiable function since the differential coefficient f'(x) of f(x) is used. As stated in Difference 1), the line in the graph on the ratio SF and the code amount CL (see FIG. 15) is considered to become a step-like one. At the joints of the steps, such a step-like function is undifferentiable, i.e., the differential coefficient tends to infinity.

Since a detailed description is not given in the publication No. Hei. 4-2291, a method of avoiding this problem is unclear. However, the following two methods can be cited as conceivable avoiding methods.

The first avoiding method is one in which the respective coefficients of Formula (1), which is an approximate expression, are first fixed, and are mathematically differentiated. If Formula (1) is differentiated, the following formula is obtained.

$$\frac{\partial CL}{\partial SF} = a \cdot e^b \cdot SF^{a-1} \quad (3)$$

Accordingly, if a and b are fixed in advance, the differential coefficient can be calculated from Formula (3).

The second avoiding method is one in which Formula (2) is discretely extended such that differentiation becomes unnecessary, and estimation is carried out in accordance with Formula (4).

$$x_1 = \frac{x_0 - (x_0 + \Delta x)}{f(x_0) - f(x_0 + \Delta x)} \{y - f(x_0)\} + x_0 \quad (4)$$

Here, $\Delta x$ is set to be an infinitesimal number. Since the limit of $\Delta x \rightarrow 0$ in Formula (4) is equivalent to Formula (2), it can be readily appreciated that Formula (4) is an approximation of Formula (2). If the discrete Newton-Raphson method based on this Formula (4) is used, it is, in principle, possible to obtain the ratio SF corresponding to the desired code amount CL.

Which of the avoiding methods is to be used in the conventional art is arbitrary, and problems arise in the respective cases. A description will be given hereafter of these problems.

First, a description will be given of the problems involved in the first avoiding method. A first problem is ascribable to the fact that coefficients need to be determined in advance in the first avoiding method. As described in Difference 4), the value of a is not fixed. Accordingly, if a mismatch has occurred between a which is determined at the outset and the image which is an object to be actually coded, the converging characteristic becomes poor. This is the first problem.

In addition, as a second problem, it is possible to cite that Formula (1) is merely an approximate expression, as described in Differences 2) and 3). Accordingly, Formula (3) obtained from Formula (1) is also a mere approximate expression, so that if the effects of Differences 2) and 3) appear, he converging characteristic deteriorates.

Next, a description will be given of the problems of the second avoiding method. A first problem concerns the converging characteristic of the Newton-Raphson method. As described in Difference 2), the graph on the relationship between the actual ratio SF and the code amount CL includes small projections and depressions. If the Newton-Raphson method is used with respect to the graph having such projections and depressions, there are cases where a good convergence is not obtained. A description will be given of this aspect.

Here, a continuous case is considered for the sake of simplicity, but it should be noted that the continuous case is essentially the same as a discretely considered case. FIG. 17 is a schematic diagram of the case. As can be seen from FIG. 17, if $x_0$ is taken as an initial value, it is true that $x_1$ obtained by the Newton-Raphson method approaches the solution X, but if the difference between the respective ones of $f(x_1)$ and $f(X)$ on the one hand, and Y on the other, is considered, it can be seen that the difference is expanding. In addition, if $x_2$ is taken as an initial value, it can be seen that $X_3$ itself which is obtained by the Newton-Raphson method becomes more distant from the solution X.

A second problem concerns the processing load of the Newton-Raphson method. If the Newton-Raphson method is considered discretely, f(x) must be calculated at two points, $x_0$ and $(x_0+\Delta x)$ in order to calculate Formula (3). Accordingly, two codings must be carried out to calculate Formula (3), so that the amount of processing load is large.

To summarize the above, it is considered that the prior art has the following problems.

The following problems will occur if the first avoiding method is selected.

Problem 1): If the predetermined a has undergone a mismatch, the converging characteristic deteriorates.

Problem 2): If an approximation of Formula (3) does not fit, the converging characteristic deteriorates.

The following problems will occur if the second avoiding method is selected.

Problem 3): The converging characteristic cannot be ensured in the case of a graph having projections and depressions as in the relationship between the ratio SF and the code amount CL.

Problem 4): The processing load in estimation processing is large.

SUMMARY OF THE INVENTION

An object of the present invention is to overcome the above-described problems and thereby provide an image coding apparatus for estimating the relative ratio SF with respect to the quantization width with high accuracy.

According to the invention, there is provided an image coding apparatus comprising an image transforming section for subjecting inputted image data to compression processing; a quantizing section for quantizing the transformed data using a quantization width; a variable-length coding section for subjecting the quantized data to variable-length coding; a code-amount computing section for storing a partial code amount and computing a total code amount; a control section for providing control in correspondence with the code amount; an estimating-method selecting section for adaptively selecting a quantization-width estimating method; a coded-result storage section for storing data on the code amount corresponding to the quantization width; and first and second quantization-width estimating sections having mutually different estimating methods.

FIG. 1 is a block diagram illustrating the concept of the invention. In FIG. 1, reference numeral 10 denotes the image transforming section; 20 denotes the quantizing section; 30 denotes the variable-length coding section; 40 denotes the code-amount computing section; 50 denotes the control section; 60 denotes the estimating-method selecting section; 70 denotes the coded-result storage section; 80 denotes the first quantization-width estimating section; 90 denotes the second quantization-width estimating section; 110 denotes the image data; 120 denotes the transformed data; 130 denotes the quantized data; 140 denotes the coded data; 150 denotes the partial-code-amount data; 160 denotes the total-code-amount data; 170, 200, and 220 denote the control data; 180 and 190 denote the coded-result data; and 210 and 230 denote the quantization-width data.

The image transforming section may have means for storing the transformed data.

The variable-length coding section may have means for storing the coded data.

It should be noted that, in the above-described configuration of the invention, the number of the quantization-width estimating sections need not be restricted to two, and there is no essential change if three or more quantization-width estimating sections are used.

The invention is applicable to a facsimile machine, for instance. In that case, the image data 110 in FIG. 1 is inputted by a scanner, and the coded data 140 is outputted to a communication apparatus. Also, when the present invention is applied to an image data base, the coded data 140 is outputted to an image storage device such as a hard disk. Further, when such apparatuses are used on-line, there are cases where the input of the image data 110 is effected from a communication apparatus. As other examples of application, it is possible to cite apparatuses for which images need to be stored after being compressed, such as a copying machine, an image editor, a printer buffer, and the like.

First, in accordance with the first aspect of the invention, a description will be given of the operation of each section shown in FIG. 1. Of these sections, a description of portions that are similar to those of the prior art will be omitted.

Upon receipt of an instruction from the control section 50, the estimating-method selecting section 60 adaptively selects an estimating method in correspondence with the situation at that time, and instructs a start of estimation processing to a corresponding quantization-width estimating section. The coded-result storage section 70 stores data on the coded results used in selection processing by the estimating-method selecting section 60, and provides the same to the estimating-method selecting section 60, as required. Each of the first quantization-width estimating section 80 and the second quantization-width estimating section 90 estimates a quantization width for obtaining a desired code amount by using a different estimating method.

FIG. 2 is a flowchart explaining the operation of the image coding apparatus of the invention. FIGS. 3 and 4 are flowcharts respectively explaining S30 and S80 in the drawing. With reference to these drawings, a description will be given hereafter of the operation.

Portions that are similar to those of the prior art will be denoted by the same reference numerals, and a description thereof will be omitted. In S80, the estimating-method selecting section 60 adaptively alters the estimating method in correspondence with the situation of the coded-result storage section 70.

As for S80, a description will be given by referring to FIG. 7(b), which shows details of the estimating-method selecting section 60. In S84, the estimating-method determining section 64 checks the number of pieces of data stored in the coded-result storage section 70, and if there are two or more pieces of data, the operation proceeds to S85, and, if not, to S89. In S85, of the data stored in the coded-result storage section 70 in an SF selecting section 61, SF1 which gave a value closest to a desired CL and SF2 which gave a value second closest thereto are selected. In S86, a difference calculating section 62 calculates the absolute value of the difference between SF1 and SF2. In S87, a comparison of the relative magnitude is made between the value obtained in S85 by a comparing section 63 and a threshold value Th set in advance. If Th is greater, in S88, an estimating-method determining section 64 determines the use of the second quantization-width estimating section 90 for which the estimating method 2 has been set, and prepares an execution command together with necessary data as the control data 220. If Th is smaller, in S89, the estimating-method determining section 64 determines the use of the first quantization-width estimating section 80 for executing the estimating method 1, and prepares an execution command together with necessary data as the control data 200. In S83, the control data prepared in S88 or S89 is sent from the estimating-method determining section 64.

In S81, the coded data 180 is sent from the estimating-method selecting section 60 to the coded-result storage section 70. The content of the coded data 180 consists of a set of the quantization width used and the total code amount as a result of it. The arrangement provided is such that these pieces of data are included in the control data 170, and are sent in advance from the control section 50 to the estimating-method selecting section 60. In S82, the estimating-method selecting section 60 selects a best estimating system while reading the data stored in the coded-result storage section 70, as required. At the same time, data necessary for the estimation is prepared. In S83, an execution command and necessary data are sent to the first quantization-width estimating section 80 or the second quantization-width estimating section 90 for executing the estimating method selected in S82 as the control data 200 or the control data 220, respectively.

In terms of another difference with the prior art, the quantization-width estimating section which has received the execution command starts estimation processing in S90. Further, the quantization data used in quantization processing in S32 is sent from the first quantization-width estimating section 80 or the second quantization-width estimating section 90 to the quantizing section 20 as the quantization-width data 210 or the quantization data 230.

Reference numeral 61 denotes the SF selecting section; 62, the difference calculating section; 63, the comparing section; and 64, the estimating-method determining section. In addition, reference numeral 191 denotes coded-result data; 192, SF difference-value data; and 193, compared-result data. The SF selecting section 61 selects two pieces of data closest to the desired CL from among the coded-result data 190, and sends the same to the difference calculating section 62. The difference calculating section 62 calculates the absolute value of the difference between the two pieces of SF data included in the coded-result data 191, and transmits the result as the SF difference-value data 192 to the comparing section 63 and the estimating-method determining section 64. The comparing section 63 compares a threshold value set in advance with the SF difference-value data 192, and transmits the result to the estimating-method determining section 64 as the compared-result data 193. On the basis of the compared-result data 193, the estimating-method determining section 64 sends an estimation executing command and necessary data among the coded-result data 191 to the first quantization-width estimating section 80 or the second quantization-width estimating section 90 ad the control data 200 or the control data 220, respectively.

The control section 50 may perform control in such a manner as to stop statistical processing if the repetition of estimation processing has exceeded a prescribed number of times even if the difference between the code amount and the target code amount does not fall within an allowable range.

The image transforming section 10 may store the transformed data 120 in a first estimation processing, and output the stored transformed data 120 in the estimation processing that follows.

The variable-length coding section 30 may store the latest coded data among the prepared coded data, or the coded data closest to the target code amount, and output to an external device the stored coded data as the coded data 140 when the control section 50 has instructed coding processing.

BRIEF DESCRIPTION OF THE DRAWINGS

FIG. 2 is a schematic flowchart explaining the operation in accordance with the present invention;

FIG. 3 is a flowchart explaining the operation of coding processing;

FIG. 4 is a flowchart explaining the selecting operation of an estimating method illustrated in FIG. 3;

FIG. 8 is a flowchart explaining the operation of the embodiment;

FIG. 9 is a flowchart explaining the operation of selecting an estimating method, which is shown in FIG. 8;

FIG. 13 is a flowchart explaining the operation of the conventional example;

DESCRIPTION OF THE PREFERRED EMBODIMENT

Before describing the embodiments concretely, a description will be given of specific methods for avoiding the problems cited in connection with the prior art. First, a description will be given hereafter of two estimating methods.

Estimating method 1): a in Formula (1) is considered as a constant. In terms of the way in which Formula (4) is written, we have the following Formula (5):

$$x_1 = C\{y - f(x_0)\} + x_0 \quad (C: \text{constant}) \quad \ldots (5)$$

Figure 1:
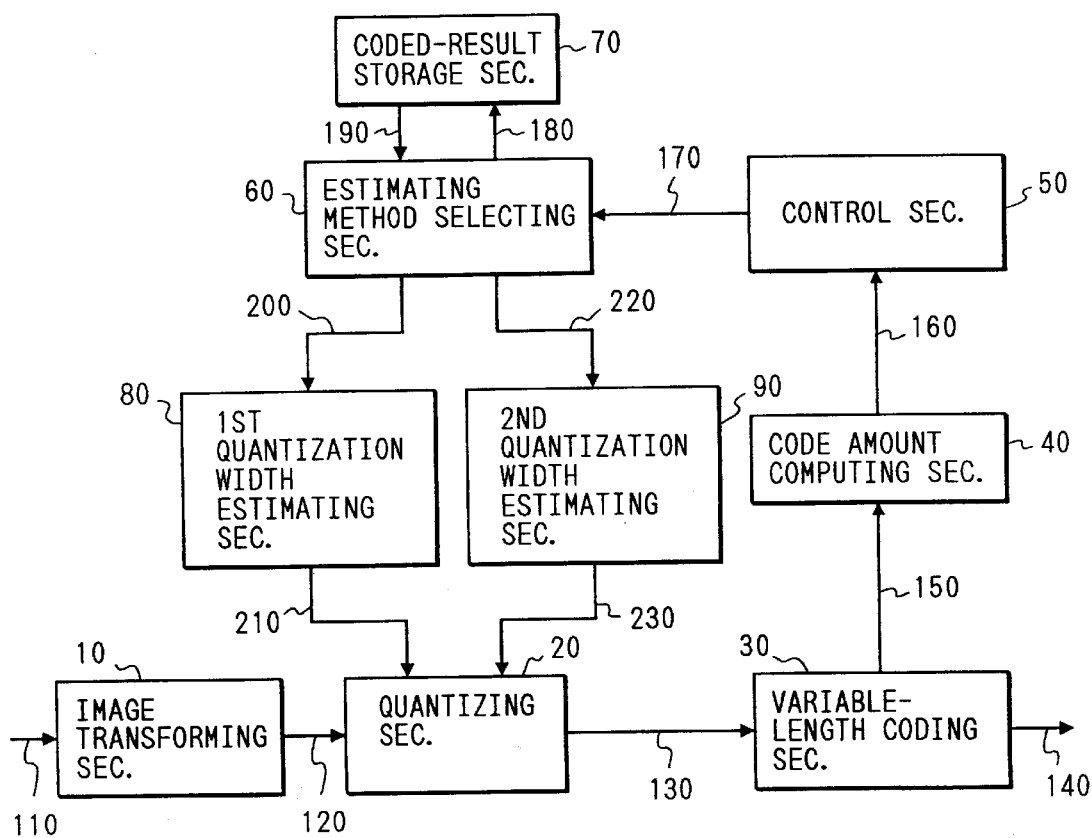
FIG. 1 is a schematic diagram in accordance with the present invention.
Figure 5:
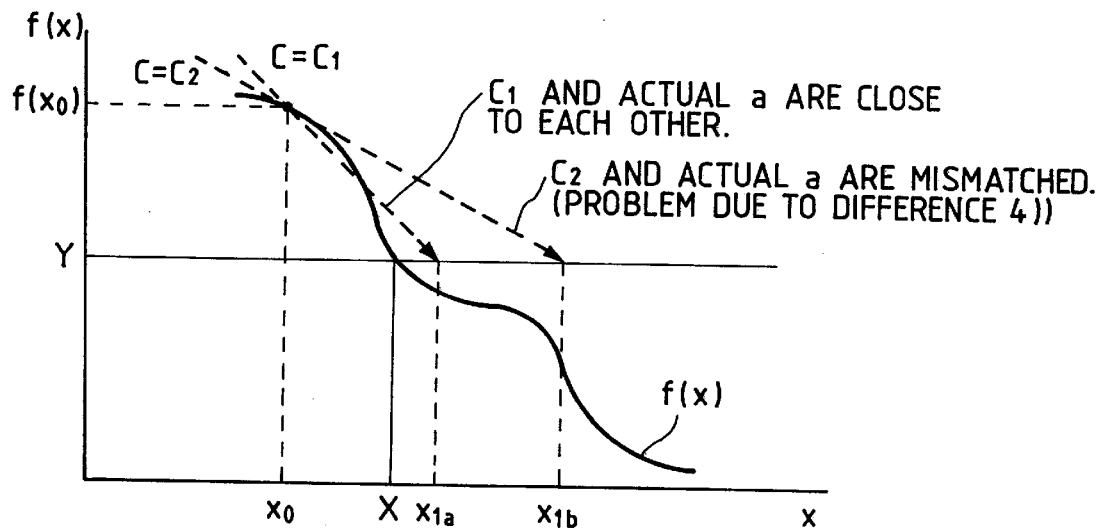
FIG. 5 is a schematic diagram of an example explaining a method of estimating the quantization width.

This method is the same as the first avoiding method which has been described concerning the prior art. FIG. 5 is a schematic diagram illustrating this method. In this method, the problems 3) and 4) which have been pointed out concerning the prior art need not be considered, but problems 1) and 2) are not resolved.

Figure 6:
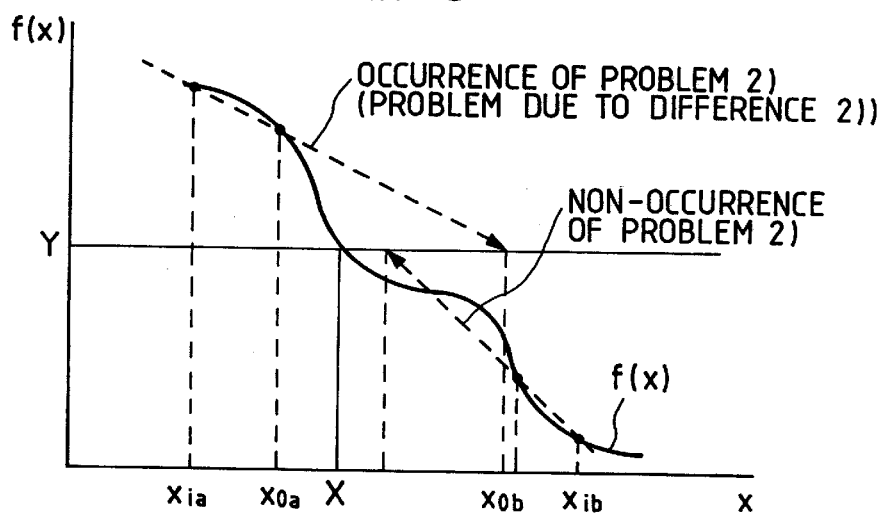
FIG. 6 is a schematic diagram of another example explaining the method of estimating the quantization width.

Estimating method 2): Data on the ratio SF and the code amount CL obtained in the process of obtaining the ratio SF are used in the calculation of a. FIG. 6 is a schematic diagram explaining this method. Here, a is calculated by the following formula:

$$a = \frac{f(x_i) - f(x_0)}{x_i - x_0} \quad (6)$$

where $x_i$ is assumed to be one of the pieces of data determined before. According to this method, it is possible to solve the problems 1), 2), and 4) pointed out in the prior art, but the problem 3) still remains.

Thus, although a number of modifications are conceivable as the method for estimating the relative ratio SF with respect to the quantization width, both advantages and disadvantages are present in each of the modifications. The basic concept of the present invention is to selectively use such a plurality of estimating methods in accordance with the situation.

Accordingly, the following selecting processing is carried out in this embodiment. First, of the data on the relationship between the relative ratio SF with respect to the quantization width and the code amount CL, which was obtained in the repetition of the estimation processing, two pieces of data close to a target code amount are selected. The difference between the ratios SF of these two pieces of data is calculated, and if this difference is less than or equal to a threshold value, the estimating method 1) is used. If not, the estimating method 2) is used.

In other words, if the data at two points are close to each other, there is a high possibility of the occurrence of the problem 3), so that the estimating method 1), which is capable of coping with the problem 3), is used. In addition, in a case where the data at the two points are relatively distant from each other, the problems 1) and 2) are conceivably more important, so that the estimating method 2) is used.

Figure 7A:
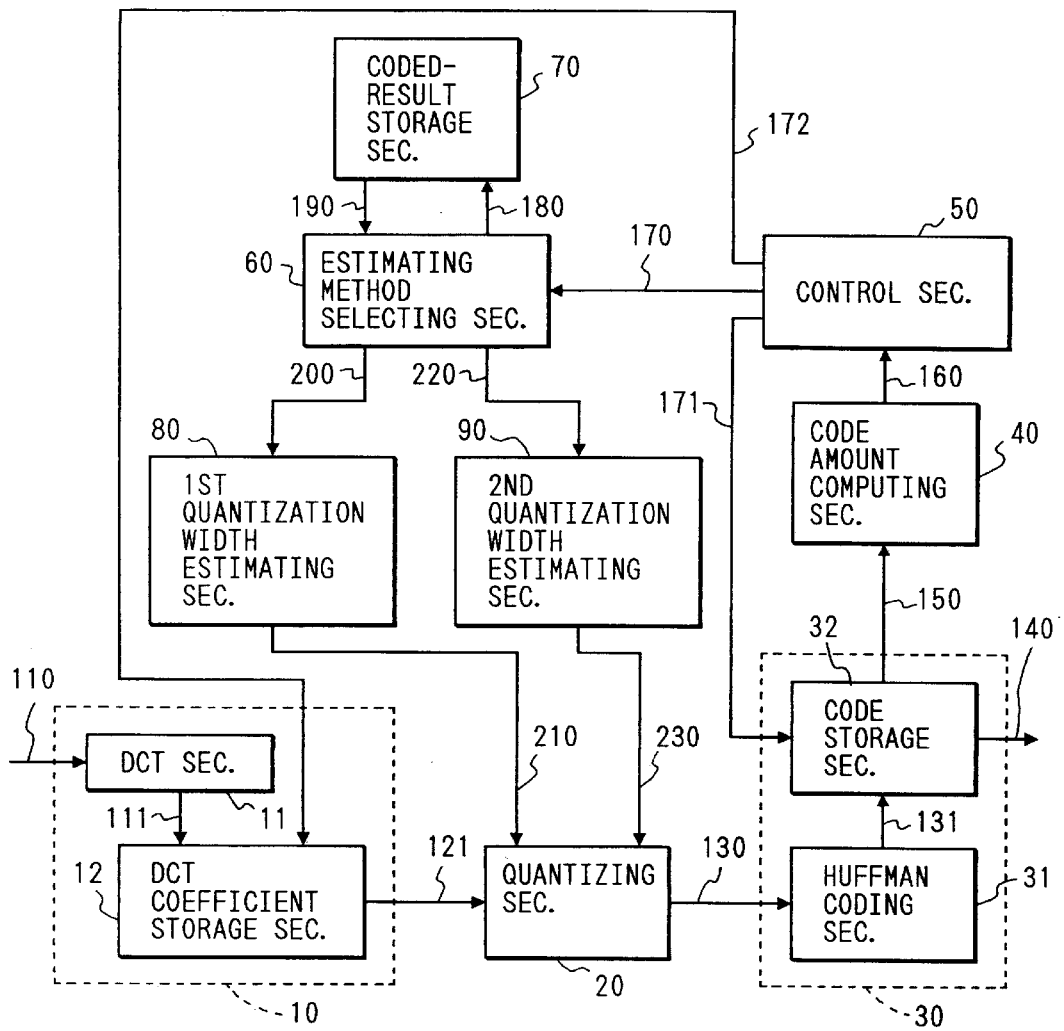
FIGS. 7(a) and 7(b) show a configuration of an embodiment.
Figure 7B:
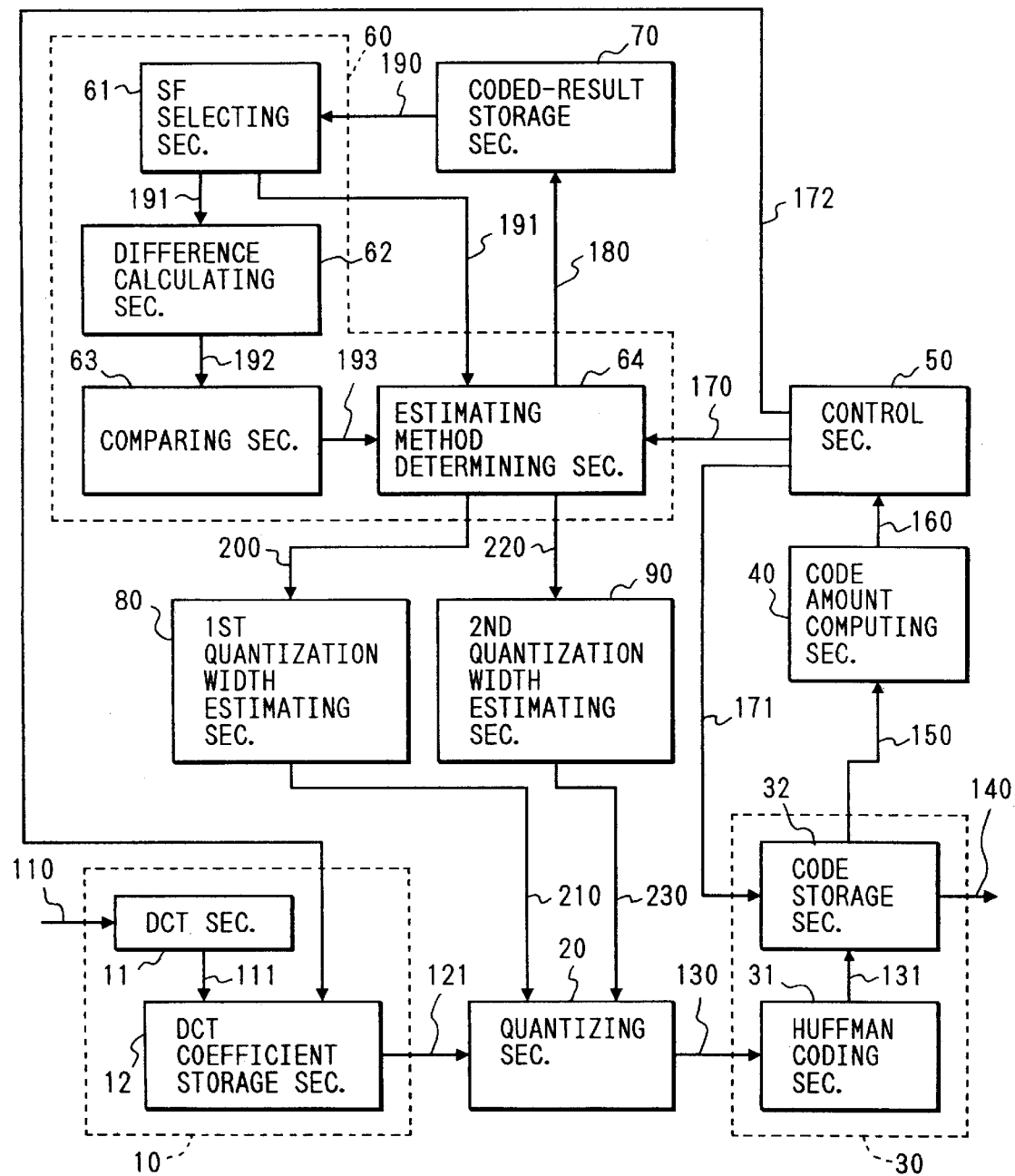

Next, a description will be given of a specific description of this embodiment. FIG. 7(a) is a diagram of an embodiment in which the present invention is applied to an image coding apparatus of the JPEG system. It should be noted that those portions that are indicated by dotted lines show correspondences with those of the schematic diagram of the present invention. In the drawing, reference numeral 11 denotes a discrete cosine transform (DCT) section; 12 denotes a DCT coefficient storage section; 31 denotes a Huffman coding section; 32 denotes a code storage section; 111 and 121 denote DCT coefficient data; 131 denotes partially-coded data; and 171 and 172 denote control data.

Next, a description will be given of the respective portions of FIG. 7(a). The DCT section 111 subjects image data 110 to a discrete cosine transform, and sends the result as the DCT coefficient data 111 to the DCT coefficient storage section 12. The DCT coefficient storage section 12 stores the DCT coefficient data 111, and sends the same as the DCT coefficient data 121 to a quantizing section 20 in accordance with the control data 172. The Huffman coding section 31 subjects quantized data 130 to Huffman coding, and sends the Huffman-coded data as the partially-coded data 131 to the code storage section 32. The code storage section 32 stores the partially coded data. 131. Then, the code storage section 32 either sends the partial code amount as partial-code-amount data 150 to a code-amount computing section 40 or sends the stored coded data as coded data 140 to an external device in accordance with the control data 171. A control section 50 differs only in its object to be controlled from the schematic diagram of the present invention. Namely, the control section 50 controls an estimating-method selecting section 60, the code storage section 32, and the DCT coefficient storage section 12 through the control data 170, 171, and 172, respectively.

FIGS. 8 and 9 are flowcharts explaining the operation of this embodiment. Referring to these drawings, a description will be given hereafter of the operation of this embodiment. Incidentally, the portion surrounded by the dotted lines corresponds to S30 in FIG. 2.

A description of portions similar to those described in the section on the operation of the present invention will be omitted, and a description will be given of only alterations. In S36, DCT processing is carried out with respect to the image data 110 in the DCT section 11. In S37, in the DCT coefficient storage section 12, the DCT coefficient data 111 prepared in S36 is stored. In S32, quantization similar to that described in the section on operation is performed. In S38, the quantized data 130 is subjected to Huffman coding in the Huffman coding section 31. In S39, the partially-coded data 131 is stored in the code storage section 32. Since S50 is similar to the step described in the section on operation, a description thereof will be omitted. Although S60 is also basically similar to the step described in the section on operation, in a case where the total code amount falls within an allowable range, the code storage section 32 integrates the partially-coded data 131 stored therein, and sends the same as the coded data 140 to the external device (S100). On the other hand, in a case where the total code amount has exceeded the allowable range, the operation proceeds to S80.

As for S80, a description will be given with reference to FIG. 9. In S84, the number of pieces of data stored in a coded-result storage section 70 is checked, and if there are two or more pieces of data, the operation proceeds to S85, and if there are not, the operation proceeds to S89. In S85, the estimating-method selecting section 60 selects a ratio SF1 which gave a value closest to the desired code amount CL and a ratio SF2 which gave a value second closest thereto, of the data stored in the coded-result storage section 70. In S86, the estimating-method selecting section 60 calculates an absolute value of the difference between the ratio SF1 and the ratio SF2. In S87, the estimating-method selecting section 60 compares a relative magnitude of the value obtained in S85 and a threshold value Th set in advance. If the threshold value Th is greater, a determination is made to use a second quantization-width estimating section 90 for which the estimating method 2 has been set, and an execution command, together with necessary data, is prepared as control data 220. If the threshold value Th is smaller, a determination is made to use a first quantization-width estimating section 80 for executing the estimating method 1, and an execution command, together with necessary data, is prepared as control data 200. In S83, the control data prepared in S88 or S89 is sent.

In S90, upon receiving the execution command in a manner similar to that described in the item on operation, the quantization-width estimating section executes estimation processing, but a difference lies in that the operation returns to S32 after completion of the processing.

In the above-described operation, the estimating methods 1) and 2) are defined as described before.

When processing first undergoes S32, quantization-width estimation processing has not yet been executed. In this case, an appropriate quantization width is imparted as an initial value. Alternatively, the relationship between an average ratio SF and an average code amount CL may be statistically examined with respect to various images, and the code amount CL corresponding to the desired ratio SF may be set on the basis of the representative data. In this case, an arrangement may be provided such that another quantization-width estimating section having an estimating process for effecting an estimation on the basis of the representative data may be added.

In addition, the provision of the DCT coefficient storage section 12 and the code storage section 32 in the above-described configuration and operation is aimed at reducing overhead during the repetition of estimation processing, and these sections may be omitted if the simplification of the configuration is more important.

Figures 10, 12:
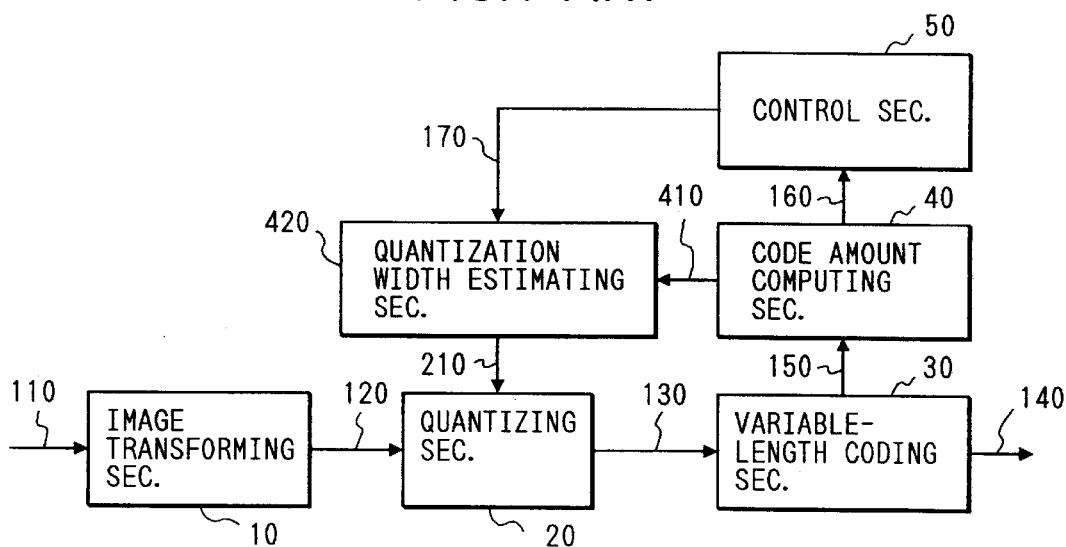
FIG. 10 illustrates an example of a data format used in the embodiment.
FIG. 12 is a schematic diagram of a conventional example.

FIG. 10 shows an example of a format of the coded-result storage section 70. In the drawing, although values are shown in the order of trial, the values may be sorted on the basis of the values of the code amount CL.

Figure 11A:
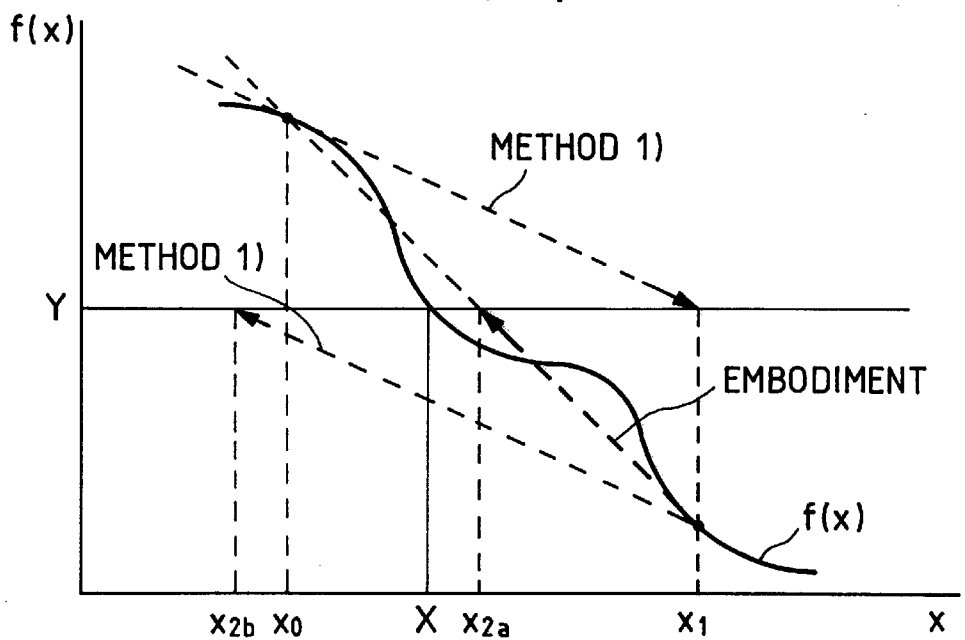
FIGS. 11(a) and 11(b) are schematic diagrams explaining advantages of the embodiment.
Figure 11B:
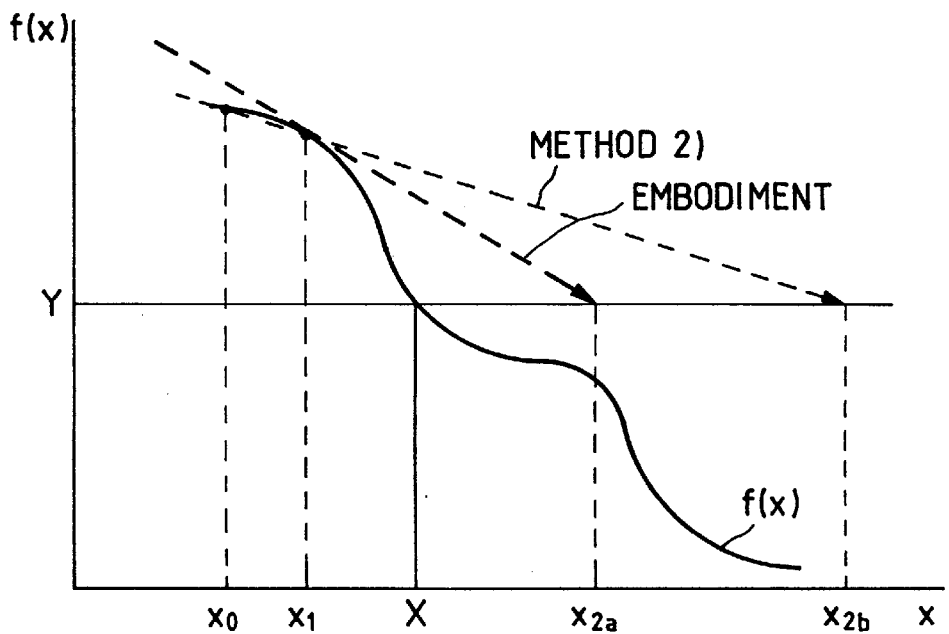
Figure 14:
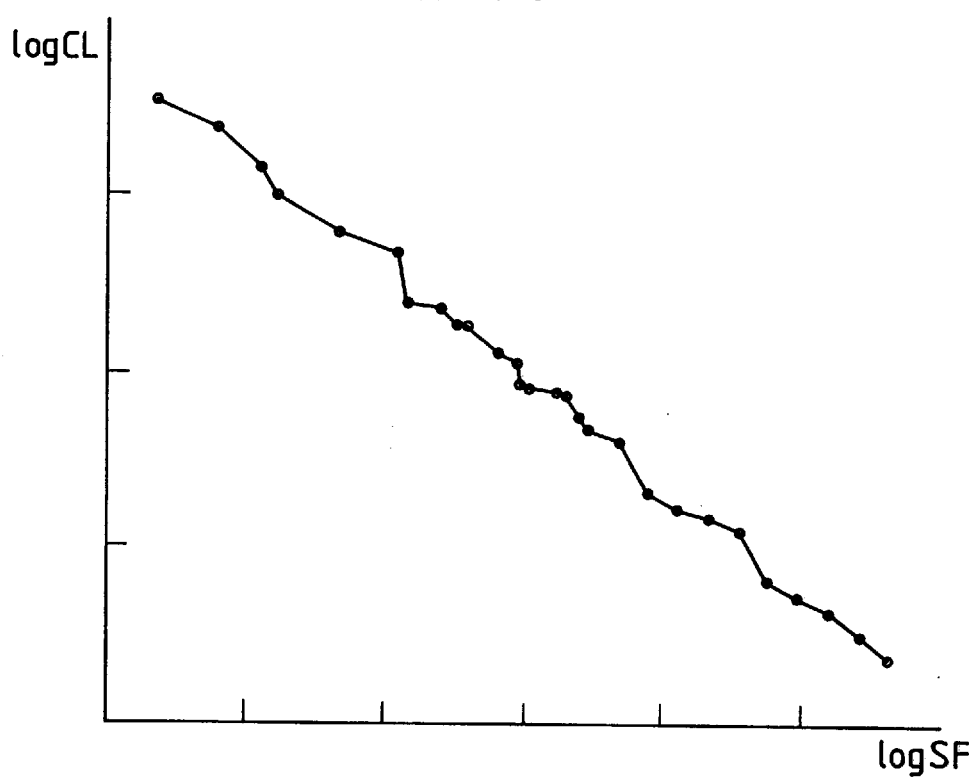
FIG. 14 is a schematic diagram illustrating the relationship between a parameter concerning quantization and a code amount.
Figure 15:
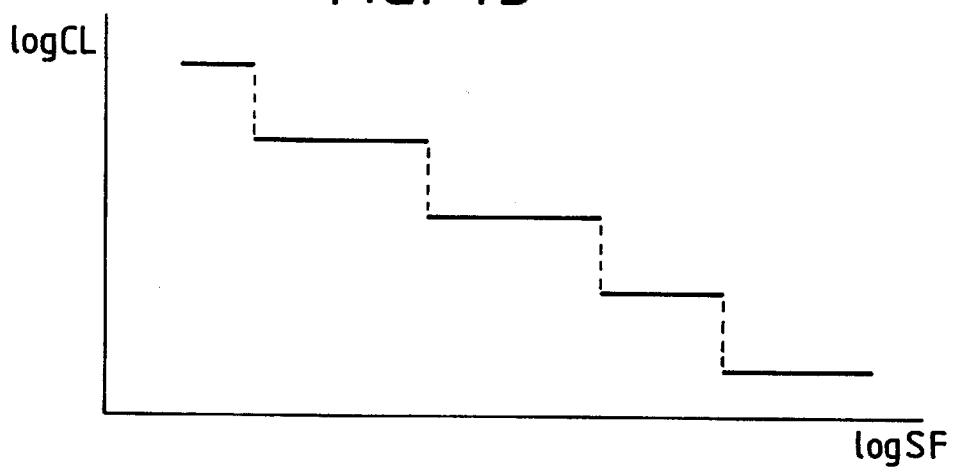
FIG. 15 is an enlarged schematic diagram illustrating the relationship between the parameter concerning quantization and the code amount.
Figure 16:
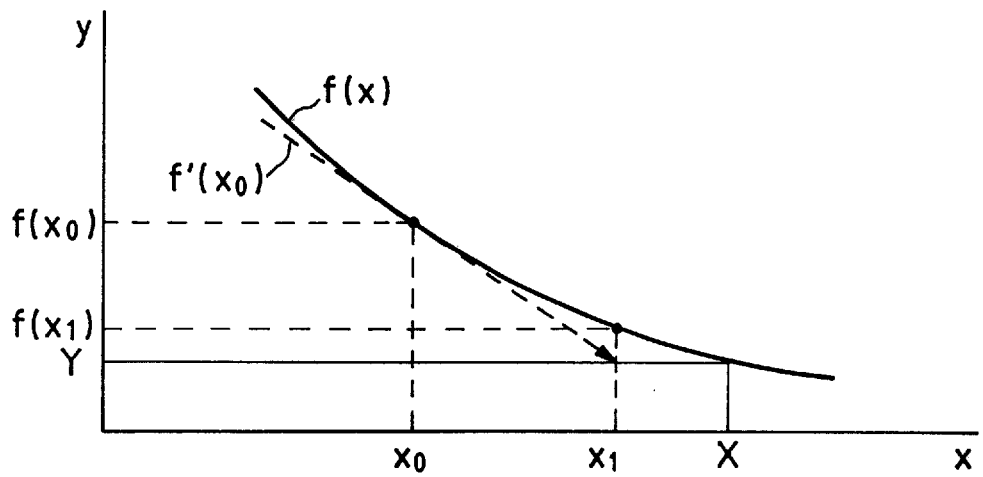
FIG. 16 is a schematic diagram explaining the Newton-Raphson method.
Figure 17:
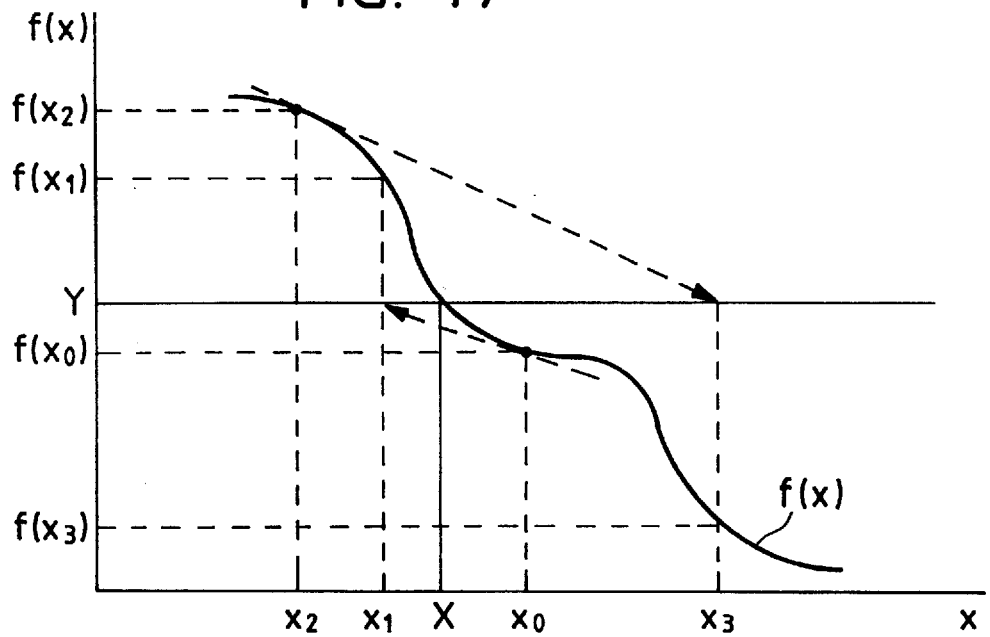
FIG. 17 is a schematic diagram explaining a problem of the Newton-Raphson method.

The advantages of the above-described embodiment will be described with reference to the schematic diagrams shown in FIGS. 11(*a*) and 11(*b*). FIG. 11(*a*) shows an example in which the constant in the estimating method 1 has undergone a mismatch. In this case, if the estimating method 1 is continued, the value becomes $x_{2b}$, and cannot approach X. In contrast, in this embodiment, since $x_0$ and $x_1$ are distant from each other, the estimating method 2 is selected, with the result that the value becomes $X_{2a}$, and is capable of approaching X.

FIG. 11(*b*) illustrates a case in which the estimating method 2 has failed. Since $x_0$ and $x_1$ are close to each other, $x_{2b}$ is distant from X owing to the effect of the small projections and depressions. In contrast, in the case of this embodiment, since the estimating method 1) is used, the value proceeds to $x_{2a}$. In this case, since the constant used in the method 1) has undergone a mismatch, the value does not approach X as compared with x1, but it can be appreciated that an improvement has been made as compared with the case where the method 2) alone is used.

Various improvements are conceivable in the selection processing of the estimating methods in accordance with this embodiment. For example, in a case where the situation has become such that a particular estimating method is always selected, there is a possibility that the transition of x is periodically repeated. To avoid this situation, it is possible to adopt an arrangement in which an upper limit is provided to the number of times a particular estimating method is continuously selected, and another estimating method is forcibly selected if the upper limit is exceeded.

In addition, in this embodiment, not much consideration is given to an estimation failure based on Difference 3) described in connection with the prior art. However, particularly in a case where the data used in the estimation is distant from the value to be obtained, even if the estimating method 2) is carried out by using the data at two distant points, the estimation sometimes deviates widely due to Difference 3). In such a case, there is a possibility that it is more advantageous to use the estimating method 1) which, although low in accuracy, is capable of suppressing a worst value of error to a certain extent as compared with the estimating method 2) which gives a large error in a case where the estimation has deviated. For such a reason, it is conceivable to adopt an improvement in which the estimating method 1) is used if the error of the code amount has become equivalent to or greater than a certain value.

Furthermore, modifications of the estimating method itself are conceivable. In a simplest example, it is conceivable to provide an estimating method 3) for averaging the estimated results of the estimating method 1) and the estimating method 2). As the selecting criterion of the estimating method 3), if the difference between the results of the estimating method 1) and the estimating method 2) has reached a certain threshold value or higher, the estimating method 3) may be used as an intermediate measure. This produces an effect of alleviating the risk when either the estimating method 1) or the estimating method 2) was selected and resulted in a failure. Additionally, with a view to obtaining a similar effect, a method is conceivable in which the result of the estimating method 2) is clipped in a fixed range.

In a slightly more complex example, in order to reduce mismatches in the estimating method 1), the gradient of the graph may be calculated by performing regression analysis or the like with respect to the data of the coded-result storage section 70, and a quantization-width estimating section may be provided which uses the gradient instead of the constant. This method is tentatively assumed as an estimating method 4). In actual use, it suffices if the selecting criterion in the embodiment is left as it is, and the estimating method 4) and the estimating method 1) are switched to each other. Alternatively, an arrangement may be provided such that the estimating method 1) is used at the outset, data representing the relationship between the code amount and the quantization width is stored in a fixed amount or more, and the estimating method 1) is changed over to the estimating method 4) at a stage where it is determined that the estimation by the estimating method 4) is more reliable.

In addition, it is possible to provide a quantization-width estimating section to which a solution of a nonlinear equation such as regula falsi, dichotomy, or the like is applied. In the description of the embodiment, a description has been given of a method in which representative data of the statistics taken with respect to various images are used as estimating values, but this is also an example of a variation of the estimating method. since these methods have their own advantages and disadvantages, it is necessary to have their characteristics reflected on the selecting criterion as in the above-described examples.

It should be noted that when these improvements are implemented, there is no need to restrict the number of the quantization-width estimating sections to two, as described in the section concerning the means for overcoming the problems.

As is apparent from the foregoing description, in accordance with the present invention, it becomes possible to efficiently determine the quantization width for obtaining a code of a desired code amount or a code amount close thereto.

Since a method of estimating the quantization width can be selected adaptively, it becomes possible to realize an estimation of higher reliability. Hence, it becomes possible to determine at a higher speed an more accurately the quantization width for obtaining a desired code amount.

It becomes possible to determine the quantization width more accurately within a desired number of estimation processings.

It becomes possible to omit transform processing which has been conventionally carried out each time estimation processing is repeated, thereby making it possible to perform efficient processing.

In cases where the latest code data is stored, it becomes possible to omit coding processing which has been conventionally carried out with the same quantization width again after the designation of coding processing, thereby making it possible to perform efficient processing. In addition, in cases where coded data closest to a target code amount is stored, it becomes possible to output coded data of a code amount which is most desirable among the data obtained in processing up until then.

What is claimed is:

1. An image coding apparatus comprising:
   an image transforming section for subjecting image data to compression processing;
   a quantizing section for quantizing the transformed data using a quantization width;
   a variable-length coding section for subjecting the quantized data to variable-length coding;
   a code-amount computing section for determining a code amount of a unit image by accumulating amounts of codes produced by said variable-length coding section;
   a control section for comparing the code amount of the unit image and a preset target code amount, and outputting data indicating a comparison result;
   a coded-result storage section for storing a relationship between a quantization width and the code amount;
   a plurality of quantization-width estimating sections for respectively estimating quantization widths by different methods, and providing the estimated quantization widths to said quantizing section; and
   an estimating-method selecting section for adaptively selecting one of said quantization-width estimating sections based on the data outputted from said control section and the coded-result storage section,
   wherein said control section controls the estimating-method selecting section to repeat processing until a difference between the code amount of the unit image and the target code amount are within an allowable range, and wherein said estimating-method selecting section selects a first one of said quantization-width estimating sections when a difference between the preset target code amount and the code amount produced by said variable-length coding section is less than or equal to a threshold value, and said estimating-method selecting section selects a second quantization-width estimating section when said difference is greater than a threshold value.

2. The image coding apparatus according to claim 1, wherein said control section, after repeating processing a predetermined number of times, outputs a signal indicating that processing has been repeated said predetermined number of times.

3. The image coding apparatus according to claim 1, wherein said image transforming section includes means for storing the compressed image data.

4. The image coding apparatus according to claim 1, wherein said variable-length coding section includes means for storing the variable-length coded quantized data having a code amount closest to the target code amount.

5. The image coding apparatus according to claim 1, wherein said image transforming section performs a discrete cosine transform.

6. The image coding apparatus according to claim 1, wherein said variable-length coding section performs Huffman coding.

7. The image coding apparatus according to claim 1, wherein said quantization-width estimating section performs a discrete Newton-Raphson method.

8. The image coding apparatus according to claim 1, wherein said quantization-width estimating section uses in the estimation processing a result obtained by applying in advance a Newton-Raphson method to an approximation formula.

9. An image coding apparatus comprising:
   input means for receiving image data;
   means for transforming the image data to produce transform coefficients;
   means for quantizing the transform coefficients with a prescribed quantization width, to produce quantized image data;
   means for variable-length coding the quantized image data;
   means for calculating a code amount of codes produced by the coding means;
   control means for determining, by approximation, the quantization width for a target code amount based on the calculated code amount with respect to a particular quantization width, and for calculating a difference between the particular quantization width and the approximated quantization width;
   first quantization width estimating means for repeatedly estimating the quantization width for the target code amount;
   second quantization width estimating means for employing an average of the particular quantization width and the approximated quantization width as the quantization width for the target code amount; and
   means for switching between the first and second quantization width estimating means based on the difference between the particular quantization width and the approximated quantization width.

10. The image coding apparatus according to claim 9, wherein the transform coefficients are DCT transform coefficients.

11. The image coding apparatus according to claim 9, wherein the quantization width is a SF coefficient.

12. The image coding apparatus according to claim 9, wherein the switching means has a threshold for the difference between the particular quantization width and the approximated quantization width, and selects the first quantization width estimating means if the difference is smaller than the threshold, and the second quantization width estimating means if the difference is larger than the threshold.

* * * * *